United States Patent
Zhang et al.

(10) Patent No.: US 11,095,034 B2
(45) Date of Patent: Aug. 17, 2021

(54) ANTENNA, PERIPHERAL CIRCUIT, ANTENNA SYSTEM, AND SIGNAL PROCESSING METHOD

(71) Applicant: Huawei Technologies Co., Ltd., Shenzhen (CN)

(72) Inventors: Huaizhi Zhang, Chengdu (CN); Sunjie Wang, Chengdu (CN); Daniele Inserra, Chengdu (CN); Guangjun Wen, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/730,767

(22) Filed: Dec. 30, 2019

(65) Prior Publication Data

US 2020/0153100 A1   May 14, 2020

Related U.S. Application Data

(63) Continuation of application No. PCT/CN2018/092184, filed on Jun. 21, 2018.

(30) Foreign Application Priority Data

Jun. 30, 2017 (CN) .......................... 201710526872.5

(51) Int. Cl.
 *H01Q 1/38* (2006.01)
 *H01Q 9/04* (2006.01)

(52) U.S. Cl.
 CPC ............. *H01Q 9/0414* (2013.01); *H01Q 1/38* (2013.01); *H01Q 9/0464* (2013.01)

(58) Field of Classification Search
 CPC ...... H01Q 9/0414; H01Q 1/38; H01Q 9/0464; H01Q 9/16; H01Q 1/2225; H01Q 1/2216;
 (Continued)

(56) References Cited

U.S. PATENT DOCUMENTS 6,563,468 B2  5/2003  Hill et al.
7,345,625 B1  3/2008  Urkowitz

FOREIGN PATENT DOCUMENTS

CN  201515012 U  6/2010
CN  101976757 A  2/2011
(Continued)

OTHER PUBLICATIONS

Lim et al., Balanced circulator structure with enhanced isolation characteristics; Microwave and Optical Technology Letters, vol. 50, No. 9, pp. 2389-2391, Wiley-Blackwell, Hoboken, NJ (Sep. 2008).
(Continued)

*Primary Examiner* — Dameon E Levi
*Assistant Examiner* — David E Lotter
(74) *Attorney, Agent, or Firm* — Leydig, Voit & Mayer, Ltd.

(57) ABSTRACT

The antenna in the embodiments provided includes: a first-layer antenna, a second-layer antenna, a first probe, a second probe, a first connector, and a second connector. An annular microstrip patch is attached to each of main bodies of the first-layer antenna and the second-layer antenna. The annular microstrip patch attached to the first-layer antenna is provided with a first feeding network and a second feeding network therein. The first-layer antenna is connected to the first probe and the second probe by using the first feeding network and the second feeding network respectively. The first-layer antenna is connected to the first connector and the second connector. A position of the first connector corresponds to a position where the first probe is connected to the first-layer antenna. A position of the second connector corresponds to a position where the second probe is connected to the first-layer antenna.

7 Claims, 5 Drawing Sheets

(58) Field of Classification Search
CPC .. H01Q 1/36; H01Q 1/50; H01Q 7/00; H01Q 23/00; G01S 7/40
See application file for complete search history.

(56) References Cited

FOREIGN PATENT DOCUMENTS

| | | |
|---|---|---|
| CN | 104078769 A | 10/2014 |
| CN | 104993239 A | 10/2015 |
| CN | 204966702 U | 1/2016 |
| CN | 105990681 A | 10/2016 |
| CN | 106252858 A | 12/2016 |

OTHER PUBLICATIONS

Shetty et al., "Circularly Polarized Broadband Annular Ring Array Antenna for 4G Communications," Military Communications Conference, XP010903029, pp. 1-4, Institute of Electrical and Electronics Engineers, New York, New York (Oct. 2005).
Fu et al., "Broadband Circularly Polarized Microstrip Antenna with Coplanar Parasitic Ring Slot Patch for L-Band Satellite System Application," IEEE Antennas and Wireless Propagation Letters, vol. 13, XP011549214, pp. 943-946, Institute of Electrical and Electronics Engineers, New York, New York (May 2014).

ANTENNA, PERIPHERAL CIRCUIT, ANTENNA SYSTEM, AND SIGNAL PROCESSING METHOD

CROSS-REFERENCE TO RELATED APPLICATIONS

This application is a continuation of International Application No. PCT/CN2018/092184, filed on Jun. 21, 2018 which claims priority to Chinese Patent Application No. 201710526872.5, filed on Jun. 30, 2017. The disclosures of the aforementioned applications are hereby incorporated by reference in their entireties.

TECHNICAL FIELD

Embodiments of the present invention relate to the field of wireless communications, and in particular, to an antenna, a peripheral circuit, an antenna system, and a signal processing method.

BACKGROUND

Radio frequency identification (RFID) technology is widely applied. Some statistical data shows that market space of RFID technology in the United States is predicted to reach 22 billion US dollars by 2020. In supermarkets and stores such as Walmart and Decathlon, goods are managed through RFID, and even in a train system running in the United States, carriages are managed through RFID.

A transmission distance supported by current RFID technology is 10 meters. However, a deployment distance between small cells is 20 meters. To be specific, the transmission distance of RFID needs to be increased to 20 meters to enable a small cell to support an RFID service. However, the transmission distance supported by the current RFID technology is only 10 meters. Main reasons are power of waking up an identifier, receiving sensitivity of the identifier, a level of cancelling interference in an excitation signal of a reader, and receiving sensitivity of the reader.

Currently, to enhance the level of cancelling the interference in the excitation signal of the reader-, the RFID reader instrument manufacturer Impinj, Inc. implements cancellation of the interference in the excitation signal through analog cancellation and digital cancellation by using a product R2000 Reader system. However, because a capability of cancelling the interference in the excitation signal is limited by precision of an attenuator and a phase shifter, the capability of cancelling the interference in the excitation signal is limited.

In addition, some merchants improve, through separation of antenna sending and receiving, the capability of cancelling the interference in the excitation signal. However, RFID deployment costs are increased (when an antenna is remotely deployed), and performance varies with an environment. Consequently, optimal performance cannot be ensured.

SUMMARY

Embodiments of the present invention provide an antenna, a peripheral circuit, an antenna system, and a signal processing method, to form vertical dipoles by using a first probe and a second probe that are highly isolated from each other.

A first aspect of this application provides an antenna, including:

a first-layer antenna, a second-layer antenna, a first probe, a second probe, a first connector, and a second connector, where main bodies of the first-layer antenna and the second-layer antenna are both planar insulation sheets, an annular microstrip patch is attached to each of the main bodies of the first-layer antenna and the second-layer antenna, and the annular microstrip patch attached to the first-layer antenna is provided with a first feeding network and a second feeding network therein; the main bodies of the first-layer antenna and the second-layer antenna are connected to each other by using an insulator column, and the first-layer antenna is parallel to and centrally aligned with the second-layer antenna; the first-layer antenna is connected to the first probe and the second probe by using the first feeding network and the second feeding network respectively, the first probe and the second probe are both rod-like and are parallel to each other, and the first probe and the second probe point to the second antenna by using a contact point between the first probe and the first-layer antenna and a contact point between the second probe and the first-layer antenna as start points respectively; the first-layer antenna is connected to the first connector and the second connector, wherein a position of the first connector corresponds to a position where the first probe is connected to the first-layer antenna, and a position of the second connector corresponds to a position where the second probe is connected to the first-layer antenna; the first connector and the second connector are configured to receive a first signal current and a second signal current respectively; the first probe and the second probe are configured to form vertical dipoles based on the first signal current and the second signal current respectively; and each of the first-layer antenna and the second-layer antenna is configured to generate a feedback signal current based on the vertical dipoles by using the annular microstrip patch attached to each of the first-layer antenna and the second-layer antenna.

Optionally, space between the first-layer antenna and the second-layer antenna is filled with air or foam.

Optionally, a distance between the first probe and the second probe includes 4.4 millimeters or 5 millimeters.

Optionally, the main bodies of the first-layer antenna and the second-layer antenna are both rectangular or circular.

Optionally, annular microstrip patches are attached to two sides of at least one of the main bodies of the first-layer antenna and the second-layer antenna.

A second aspect of this application provides a peripheral circuit, including:

a first phase shifter, a second phase shifter, a first circulator, a second circulator, and the antenna according to the first aspect, where the antenna is connected to the first circulator and the second circulator; the first phase shifter is connected to the first circulator and the second circulator; the second phase shifter is connected to the first circulator and the second circulator; the first phase shifter is configured to: receive a signal current, shunt the signal current to obtain a first signal current and a second signal current, perform phase shift processing on the first signal current to obtain a first phase-shifting signal current, send the first phase-shifting signal current to the first circulator, and send the second signal current to the second circulator; the first circulator is configured to send the first phase-shifting signal current to the antenna when receiving the first phase-shifting signal current sent by the first phase shifter; the second circulator is configured to send the second signal current to the antenna when receiving the second signal current sent by the second phase shifter; the antenna is configured to: receive the first phase-shifting signal current by using the first connector, receive the second signal current by using the second connector, generate a feedback signal current based on the first phase-shifting signal current and the second signal current, shunt the feedback signal current to obtain a first feedback signal current and a second feedback signal current, send the first feedback signal current to the first circulator, and send the second feedback signal current to the second circulator; the first circulator is further configured to send the first feedback signal current to the second phase shifter when receiving the first feedback signal current sent by the antenna; the second circulator is further configured to send the second feedback signal current to the second phase shifter when receiving the second feedback signal current sent by the antenna; and the second phase shifter is configured to: when receiving the first feedback signal current and the second feedback signal current, perform phase shift processing on the first feedback signal current to obtain a first phase-shifting feedback signal current, and feed back the first phase-shifting feedback signal current and the second feedback signal current.

A third aspect of this application provides an antenna system, including:

the peripheral circuit according to the second aspect that is built therein, where the antenna system is configured to: receive a signal current sent by a reader, perform signal processing on the signal current by using the peripheral circuit, to obtain a first phase-shifting feedback signal current and a second feedback signal current, and send the first phase-shifting feedback signal current and the second feedback signal current to the reader.

A fourth aspect of this application provides a signal processing method, including:

receiving, by the first connector and the second connector, a first signal current and a second signal current respectively, where in this embodiment of this application, the first connector and the second connector are connected to the outside, and are each configured to receive a signal current, herein, the signal current received by the first connector is the first signal current, the signal current received by the second connector is the second signal current, and it should be noted that the first signal current and the second signal current are signals that are generated inside a device in which the antenna is built and are used to express some information;

forming, by the first probe and the second probe, vertical dipoles based on the first signal current and the second signal current respectively, where in this embodiment of this application, the first connector is connected to the first probe, the second connector is connected to the second probe, the first connector and the second connector receive the signal currents, and the signal currents are processed by the first-layer antenna, the second-layer antenna, the first feeding network, and the second feeding network, and are transmitted to the first probe and the second probe respectively; and generating, by each of the first-layer antenna and the second-layer antenna, a feedback signal current based on the vertical dipoles by using the annular microstrip patch attached to each of the first-layer antenna and the second-layer antenna.

In this embodiment of this application, when receiving the currents, the first probe and the second probe obtain dipoles through electromagnet induction, and convert the signal currents into digital signals. Then, the antenna may send the digital signals.

A fifth aspect of this application provides a signal processing method, including:

receiving, by the first phase shifter, a signal current, shunting the signal current to obtain a first signal current and a second signal current, performing phase shift processing on the first signal current to obtain a first phase-shifting signal current, sending the first phase-shifting signal current to the first circulator, and sending the second signal current to the second circulator, where when obtaining the first signal current and the second signal current, the first phase shifter performs phase shift processing, for example, a 90° phase shift, on the first signal current to obtain the first phase-shifting signal current; sending, by the first circulator, the first phase-shifting signal current to the antenna when receiving the first phase-shifting signal current sent by the first phase shifter, where in this embodiment of this application, the first phase shifter may shunt the signal current into two parts, the two parts have same content and may have same power, and the signal current is shunted to obtain the first signal current and the second signal current for subsequent separate processing; sending, by the second circulator, the second signal current to the antenna when receiving the second signal current sent by the second phase shifter, where the first circulator may send the first phase-shifting signal current and the second signal current to the antenna, and the antenna may receive the first phase-shifting signal current and the second signal current by using the first connector and the second connector respectively, generate a feedback signal current by using the first probe and the second probe, and shunt the feedback signal current to obtain a first feedback signal current and a second feedback signal current, so that subsequent processing is separately performed; receiving, by the antenna, the first phase-shifting signal current by using the first connector, receiving the second signal current by using the second connector, generating a feedback signal current based on the first phase-shifting signal current and the second signal current, shunting the feedback signal current to obtain a first feedback signal current and a second feedback signal current, sending the first feedback signal current to the first circulator, and sending the second feedback signal current to the second circulator; further sending, by the first circulator, the first feedback signal current to the second phase shifter when receiving the first feedback signal current sent by the antenna; further sending, by the second circulator, the second feedback signal current to the second phase shifter when receiving the second feedback signal current sent by the antenna; and when receiving the first feedback signal current and the second feedback signal current, performing, by the second phase shifter, phase shift processing on the first feedback signal current to obtain a first phase-shifting feedback signal current, and feeding back the first phase-shifting feedback signal current and the second feedback signal current.

Another aspect of this application provides a computer-readable storage medium. The computer-readable storage medium stores an instruction. When the instruction is run on a computer, the computer is enabled to perform the methods according to the foregoing aspects.

It will be understood from the foregoing technical solutions that the embodiments of the present invention have the following advantages.

The main bodies of the first-layer antenna and the second-layer antenna are connected to each other by using the insulator column, and the first-layer antenna is parallel to and centrally aligned with the second-layer antenna. The first-layer antenna is connected to the first probe and the second probe by using the first feeding network and the second feeding network respectively. The first probe and the second probe are both rod-like and are parallel to each other. The first probe and the second probe point to the second antenna by using the contact point between the first probe and the first-layer antenna and the contact point between the second probe and the first-layer antenna as the start points respectively. The first-layer antenna is connected to the first connector and the second connector. A position of the first connector corresponds to a position where the first probe is connected to the first-layer antenna, and a position of the second connector corresponds to a position where the second probe is connected to the first-layer antenna, so that the first probe is isolated from the second probe. When the first connector and the second connector are configured to receive the first signal current and the second signal current respectively, the first probe and the second probe are configured to form the vertical dipoles based on the first signal current and the second signal current respectively. Each of the first-layer antenna and the second-layer antenna is configured to generate the feedback signal current based on the vertical dipoles by using the annular microstrip patch attached to each of the first-layer antenna and the second-layer antenna. Therefore, when the antenna does not need to be remotely deployed and RFID deployment costs are not increased, a capability of cancelling interference in an excitation signal is improved, and performance of the excitation signal does not vary with an environment, so that optimal performance is always easily ensured.

DESCRIPTION OF EMBODIMENTS

Embodiments of the present invention provide an antenna, a peripheral circuit, an antenna system, and a signal processing method, to form vertical dipoles by using a first probe and a second probe that are highly isolated from each other.

The following clearly describes the technical solutions in the embodiments of the present invention with reference to the accompanying drawings. It will be understood that the described embodiments are merely exemplary and are not intended to limit embodiments of the present invention.

In the specification, claims, and accompanying drawings, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "contain" and any other variants cover the non-exclusive inclusion, for example, a process, method, system, product, or device that includes a series of steps or units is not necessarily limited to those expressly listed steps or units, but may include other steps or units not expressly listed or inherent to such a process, method, product, or device.

Figure 1:
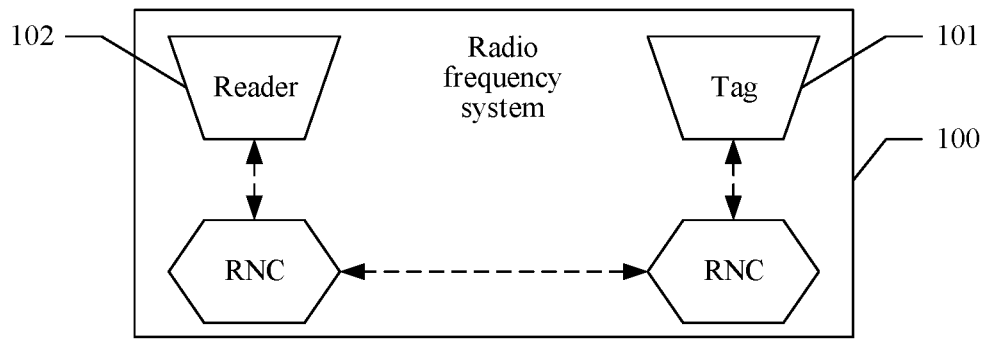
FIG. 1 is a schematic architectural diagram of a radio frequency system 100 according to embodiments of this application.

FIG. 1 is a schematic architecture diagram of a radio frequency system 100, including a tag 101 and a reader 102.

In the embodiments of this application, an antenna is a converter that converts a pilot wave propagated on a transmission line into an electromagnetic wave propagated in an unbound medium (usually free space) or performs reverse conversion. The antenna is mainly used as a component, used to transmit and receive an electromagnetic wave, of a wireless device, and is applied to engineering systems such as radio communication, broadcasting, television, radar, navigation, electronic countermeasure, remote sensing, and radio astronomy. Any of the engineering systems transferring information by using the electromagnetic wave works based on the antenna. This is not limited herein.

In the embodiments of this application, the tag, namely, a radio frequency tag, is a physical carrier of an electronic product code, and is applied and attached to a trackable object. In some embodiments, a tag may be globally circulated, and the tag may be identified and read and written in real time or in non-real-time. This is not limited herein. In the embodiments of this application, the reader is a device that performs wireless communication with the tag by using the antenna, and may implement a reading or writing-into operation on an identification code and memory data of the tag.

An RFID technology may be used to identify a high-speed moving object and may be used to simultaneously identify a plurality of tags. Operations are quick and convenient. In the embodiments of the present invention, the tag may communicate with the reader by using a radio frequency identification (Radio Frequency Identification, RFID) technology in respective built-in antenna. RFID is also referred to as radio frequency identification. In the embodiments of this application, RFID is a communications technology that may be used to identify a specific target (for example, the tag or the antenna) and read and write related data by using a radio signal, and mechanical or optical contact does not need to be established between an identification system and the specific target. RFID is particularly applicable to short-range identification communication.

A transmission distance supported by a current RFID technology is 10 meters, and a deployment distance between small cells is 20 meters. To be specific, the transmission distance of RFID needs to be increased to 20 meters to enable a small cell to support an RFID service. However, the transmission distance supported by the current RFID technology is only 10 meters. Main reasons are power of waking up an identifier, receiving sensitivity of the identifier, a level of cancelling interference in an excitation signal of a reader, and receiving sensitivity of the reader.

Currently, to enhance the level of cancelling the interference in the excitation signal of the reader, the RFID reader instrument manufacturer Impinj, Inc. implements cancellation of the interference in the excitation signal through analog cancellation and digital cancellation by using a product R2000 Reader system. However, because a capability of cancelling the interference in the excitation signal is limited by precision of an attenuator and a phase shifter, the capability of cancelling the interference in the excitation signal is limited.

In addition, some merchants improve, through separation of antenna sending and receiving, the capability of cancelling the interference in the excitation signal. However, RFID deployment costs are increased (when an antenna is remotely deployed), and performance varies with an environment. Consequently, optimal performance cannot be ensured.

Therefore, in this application, main bodies of a first-layer antenna and a second-layer antenna are connected to each other by using an insulator column, and the first-layer antenna is parallel to and centrally aligned with the second-layer antenna. The first-layer antenna is connected to a first probe and a second probe by using a first feeding network and a second feeding network respectively. The first probe and the second probe are both rod-like and are parallel to each other. The first probe and the second probe point to the second antenna by using a contact point between the first probe and the first-layer antenna and a contact point between the second probe and the first-layer antenna as start points respectively. The first-layer antenna is connected to a first connector and a second connector. A position of the first connector corresponds to a position where the first probe is connected to the first-layer antenna, and a position of the second connector corresponds to a position where the second probe is connected to the first-layer antenna, so that the first probe is isolated from the second probe. When the first connector and the second connector are configured to receive a first signal current and a second signal current respectively, the first probe and the second probe are configured to form vertical dipoles based on the first signal current and the second signal current respectively. Each of the first-layer antenna and the second-layer antenna is configured to generate a feedback signal current based on the vertical dipoles by using an annular microstrip patch attached to each of the first-layer antenna and the second-layer antenna. Therefore, when the antenna does not need to be remotely deployed and the RFID deployment costs are not increased, the capability of cancelling the interference in the excitation signal is improved, and the performance of the excitation signal does not vary with the environment, so that the optimal performance is always easily ensured.

Figure 2:
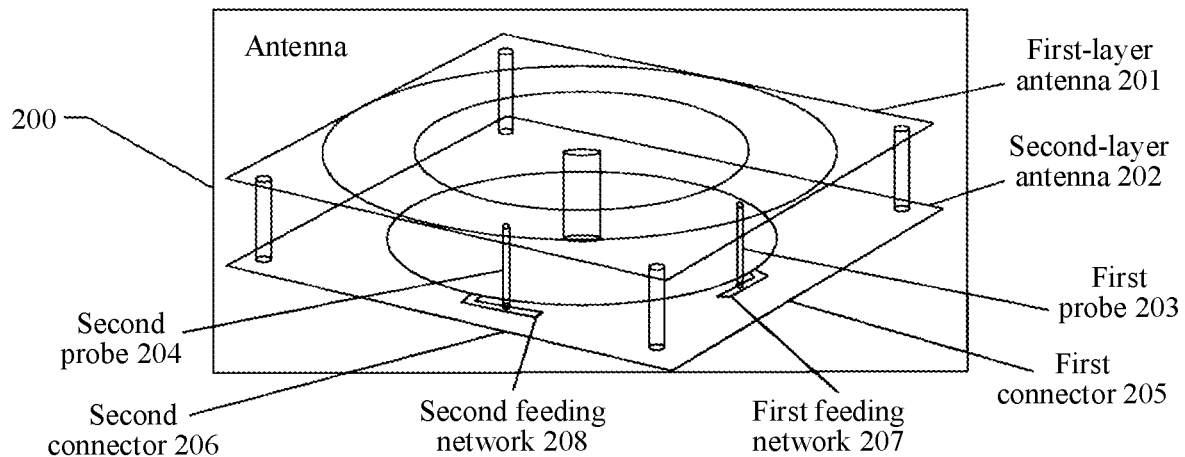
FIG. 2 is a schematic diagram of an embodiment of an antenna 200 according to the embodiments of this application.

For ease of understanding, the following specifically describes an antenna 200 in the embodiments of this application. Referring to FIG. 2, an embodiment of the antenna 200 in the embodiments of this application:

FIG. 2 shows the antenna 200, including:

a first-layer antenna 201, a second-layer antenna 202, a first probe 203, a second probe 204, a first connector 205, and a second connector 206, where main bodies of the first-layer antenna 201 and the second-layer antenna 202 are both planar insulation sheets, an annular microstrip patch is attached to each of the main bodies of the first-layer antenna 201 and the second-layer antenna 202, and the annular microstrip patch attached to the first-layer antenna 201 is provided with a first feeding network 207 and a second feeding network 208 therein.

The main bodies of the first-layer antenna 201 and the second-layer antenna 202 are connected to each other by using insulator columns 209. Optionally, the main bodies of the first-layer antenna 201 and the second-layer antenna 202 are both rectangular or circular, and the first-layer antenna 201 is parallel to and centrally aligned with the second-layer antenna 202.

The first-layer antenna 201 is connected to the first probe 203 and the second probe 204 by using the first feeding network 207 and the second feeding network 208 respectively. The first probe 203 and the second probe 204 are both rod-like and are parallel to each other. The first probe 203 and the second probe 204 point to the second antenna 202 by using a contact point between the first probe 203 and the first-layer antenna 201 and a contact point between the second probe 204 and the first-layer antenna 201 as start points respectively.

The first-layer antenna 201 is connected to the first connector 205 and the second connector 206. A position of the first connector 205 corresponds to a position where the first probe 203 is connected to the first-layer antenna 201. A position of the second connector 206 corresponds to a position where the second probe 204 is connected to the first-layer antenna 201.

In this embodiment of this application, the antenna is configured to receive a signal and convert the signal into a current, or receive a current and convert the current into a signal. A probe is such a medium used by the antenna to perform the foregoing operations. In this embodiment of this application, the probe is configured to: receive, by using a connector, a signal current, and convert the signal current into a digital signal.

In this embodiment of this application, the main bodies of the first-layer antenna 201 and the second-layer antenna 202 are planar insulation sheets. A reason for the insulation sheets is that the annular microstrip patches need to be effective when the annular microstrip patches are attached. Based on the same reason, the first-layer antenna 201 is also connected to the second-layer antenna 202 by using the insulator columns.

In this embodiment of this application, the annular microstrip patch is a microstrip antenna, and is an antenna formed by attaching a thin metal layer to one side of a thin dielectric substrate to serve as a ground plate, and manufacturing a metal patch in a particular shape on the other side of the thin dielectric substrate by using a photoengraving etching method, and by using a microstrip, a probe, and a feeding network. If a slot is obtained by engraving the ground plate, and when the microstrip is printed on the other side of the dielectric substrate, the slot feeds, to obtain a feeding network, so that a microstrip slot antenna is formed. A common type of microstrip antenna is formed by attaching a thin metal layer to one side of a thin dielectric substrate (for example, a polytetrafluoroethylene glass fiber pressure layer) to serve as a ground plate, making a metal patch in a particular shape by using a method such as photoengraving etching, and feeding the patch by using a microstrip and a probe.

In some embodiments, the first-layer antenna 201 and the second-layer antenna 202 may be circular polarized antennas, or may be array antennas. This is not limited herein. It should be noted that relative locations of the first probe 203 and the second probe 204 may easily change by using the first feeding network 207 and the second feeding network 208 respectively on the first connector 205 and the second connector 206, so that a distance between the first probe 203 and the second probe 204 is adjusted, an optimal effect can be achieved through the adjustment, and an acceptable return loss and acceptable isolation performance are implemented.

It should be noted that a dipole generally refers to a pair of electric charges or "magnetic charges" that are quite close to each other and whose signs are opposite, for example, an electric dipole including a positive charge and a negative charge. For another example, an earth's magnetic field may be approximately considered as a magnetic dipole field. Theoretical calculation indicates that an induced polarization secondary field of a spherical orebody in a uniform primary field is equivalent to a current field of an electric current dipole, and some magnetic anomalies may also be studied by using the magnetic dipole field. An equivalent dipole field is used to replace a corresponding electric field and magnetic field for study, so that a spatial distribution form and a basic quantitative concept of a field can be simply and clearly obtained, and a model experiment is also facilitated. In this embodiment of this application, a double-layer structure of the first-layer antenna 201 and the second-layer antenna 202 enables the probes to be perpendicular between the two layers of antennas. Therefore, an obtained dipole is referred to as a vertical dipole.

Figure 3:
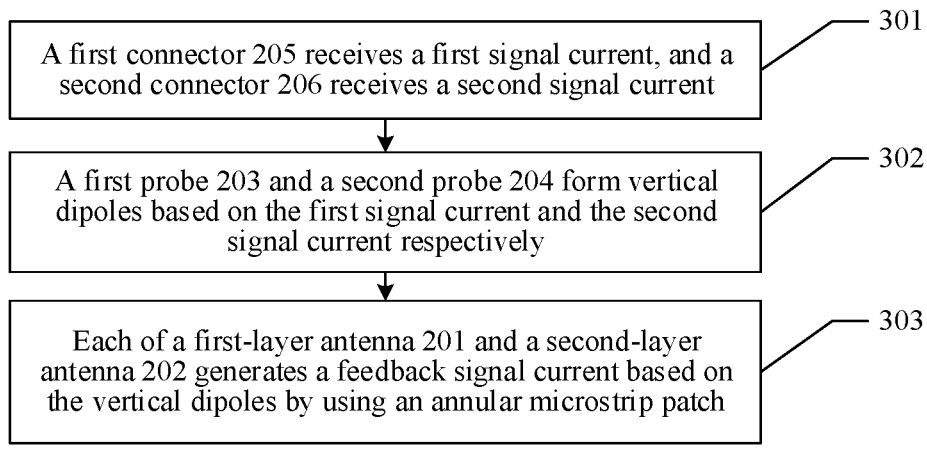
FIG. 3 is a schematic diagram of an embodiment of a signal processing method according to the embodiments of this application.

Specifically, FIG. 3 shows a working method of the antenna 200. This application provides a signal processing method, including the following steps.

301. The first connector 205 and the second connector 206 receive a first signal current and a second signal current respectively.

In this embodiment of this application, the first connector 205 and the second connector 206 are connected to the outside, and are each configured to receive a signal current. Herein, the signal current received by the first connector 205 is the first signal current, and the signal current received by the second connector 206 is the second signal current. It should be noted that the first signal current and the second signal current are signals that are generated inside a device in which the antenna 200 is built and are used to express some information.

302. The first probe 203 and the second probe 204 form vertical dipoles based on the first signal current and the second signal current respectively.

In this embodiment of this application, the first connector 205 is connected to the first probe 203. The second connector 206 is connected to the second probe 204. The first connector 205 and the second connector 206 receive signal currents. The signal currents are processed by the first-layer antenna 201, the second-layer antenna 202, the first feeding network 207, and the second feeding network 208, and are transmitted to the first probe 203 and the second probe 204 respectively.

303. Each of the first-layer antenna 201 and the second-layer antenna 202 generates a feedback signal current based on the vertical dipoles by using the annular microstrip patch attached to each of the first-layer antenna 201 and the second-layer antenna 202.

In this embodiment of this application, when receiving the currents, the first probe 203 and the second probe 204 obtain dipoles through electromagnet induction, and convert the signal currents into digital signals. Then, the antenna 200 may send the digital signals.

Figure 4:
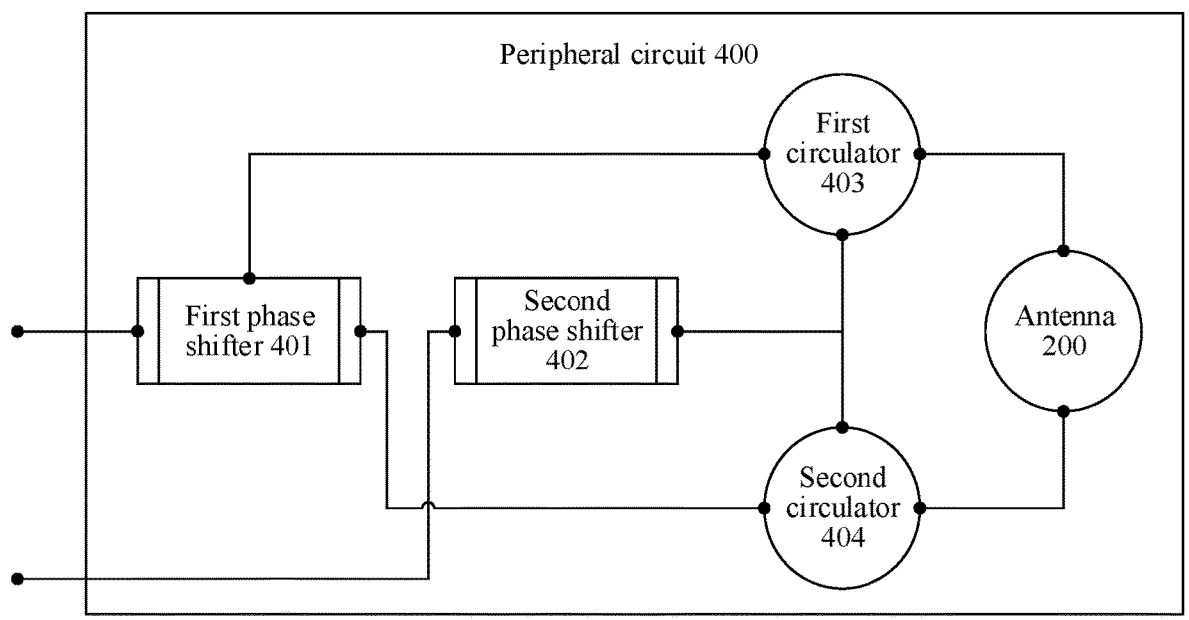
FIG. 4 is a schematic diagram of an embodiment of a peripheral circuit 400 according to the embodiments of this application.

In an embodiment of this application, the antenna 200 may be applied to a peripheral circuit 400. Referring to FIG. 4, this application further provides the peripheral circuit 400, including: a first phase shifter 401, a second phase shifter 402, a first circulator 403, a second circulator 404, and the antenna 200.

The antenna 200 is connected to the first circulator 403 and the second circulator 404.

The first phase shifter 401 is connected to the first circulator 403 and the second circulator 404.

The second phase shifter 402 is connected to the first circulator 403 and the second circulator 404.

The peripheral circuit 400 processes a signal, so that signal isolation can be increased to 42 dB, and signal isolation between antenna ports is enhanced. In some embodiments, annular microstrip patches may be attached to two sides of at least one of the main bodies of the first-layer antenna 201 and the second-layer antenna 202, to enhance a technical effect.

This application further provides an antenna system. The peripheral circuit 400 is built in the antenna system.

Figure 5:
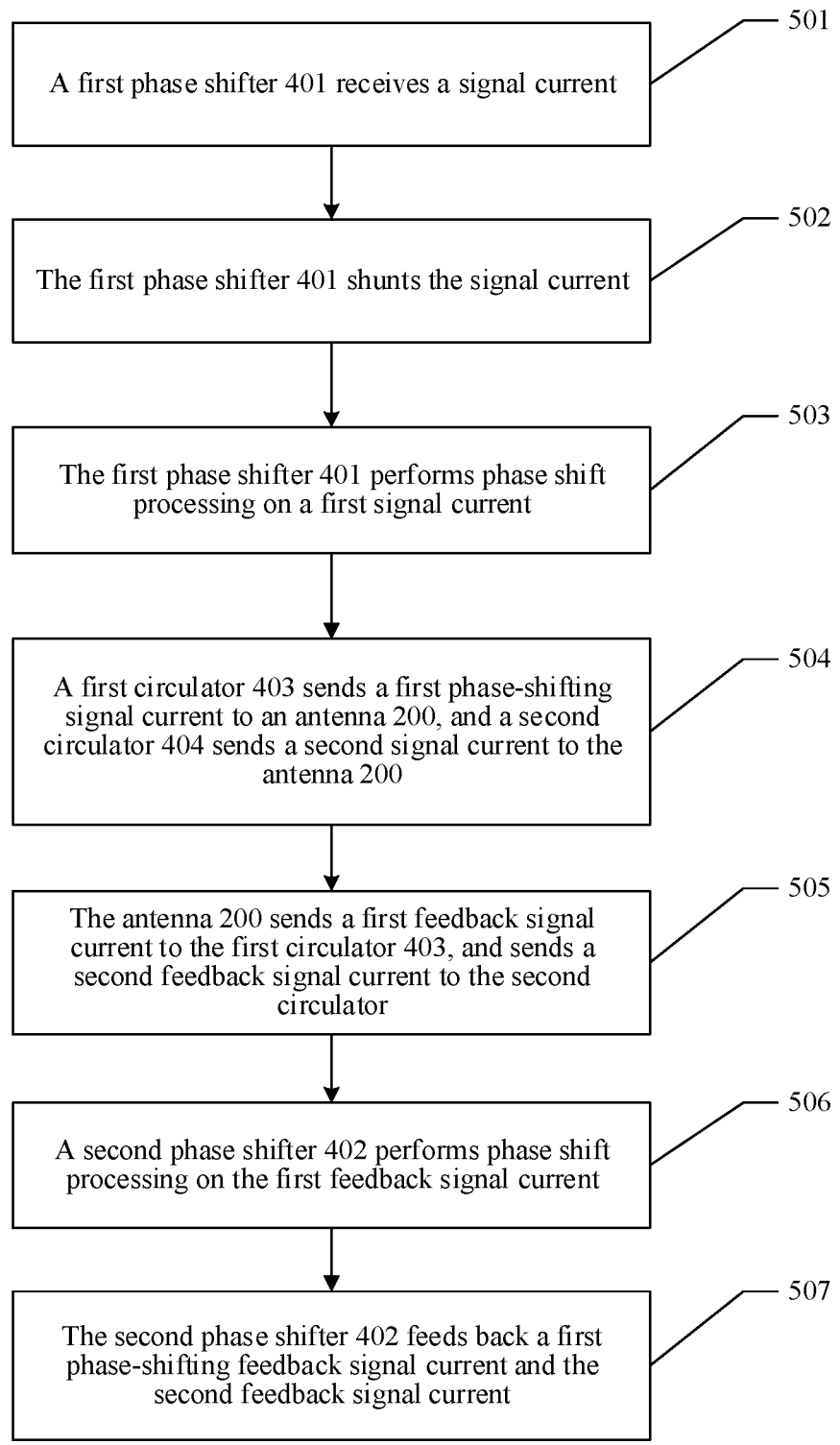
FIG. 5 is a schematic diagram of an embodiment of a signal processing method according to the embodiments of this application.

Referring to FIG. 5, this application further provides a working method of the peripheral circuit 400 or the antenna system in which the peripheral circuit 400 is built. The working method is a signal processing method, and includes the following steps.

501. The first phase shifter 401 receives a signal current.

It should be noted that a phase shifter is an apparatus that can adjust a phase of a wave. Any transmission medium introduces a phase shift to a fluctuation conducted through the transmission medium. This is a principle of an early analogue phase shifter. After development of a modern electronic technology, a digital phase shift is implemented through A/D conversion and D/A conversion. As the name implies, the digital phase shift is a discontinuous phase shift technology, but features high phase shift precision. The phase shifter is widely applied to fields such as radar, missile attitude control, accelerators, communication, instruments and apparatuses, and even music. In this embodiment of this application, the first phase shifter 401 in the peripheral circuit 300 may receive the signal current.

502. The first phase shifter 401 shunts the signal current to obtain a first signal current and a second signal current.

In this embodiment of this application, the first phase shifter may shunt the signal current into two parts. The two parts have same content and may have same power. The signal current is shunted to obtain the first signal current and the second signal current for subsequent separate processing.

503. The first phase shifter 401 performs phase shift processing on the first signal current to obtain a first phase-shifting signal current, sends the first phase-shifting signal current to the first circulator 403, and sends the second signal current to the second circulator.

When obtaining the first signal current and the second signal current, the first phase shifter 401 performs phase shift processing, for example, a 90° phase shift, on the first signal current to obtain the first phase-shifting signal current.

In this embodiment of this application, a circulator is a device that enables an electromagnetic wave to be transmitted unidirectionally and annularly. In both a modern radar system and a microwave multichannel communications system, a device having unidirectional and annular features is used. For example, in the radar system in which a receiving device and a sending device share one antenna, the circulator is usually used as a duplexer. In the microwave multichannel communications system, signals on different frequencies may be separated by using the circulator.

Therefore, when the first phase-shifting signal current is obtained, the first phase-shifting signal current and the second signal current may be sent to the first circulator 403 together, so that the first circulator 403 processes the first phase-shifting signal current and the second signal current.

504. The first circulator 403 sends the first phase-shifting signal current to the antenna 200, the second circulator 404 sends the second signal current to the antenna 200, and the antenna 200 generates a feedback signal current based on the first phase-shifting signal current and the second signal current, and shunts the feedback signal current to obtain a first feedback signal current and a second feedback signal current.

The first circulator 403 may send the first phase-shifting signal current and the second signal current to the antenna 200, and the antenna 200 may receive the first phase-shifting signal current and the second signal current by using the first connector 205 and the second connector 206 respectively, generate the feedback signal current by using the first probe 203 and the second probe 204, and shunt the feedback signal current to obtain the first feedback signal current and the second feedback signal current, so that subsequent processing is separately performed.

505. The antenna 200 sends the first feedback signal current to the first circulator 403, and sends the second feedback signal current to the second circulator, the first circulator 403 sends the first feedback signal current to the second phase shifter 402, and the second circulator 404 sends the second feedback signal current to the second phase shifter 402.

When obtaining the first feedback signal current and the second feedback signal current, the antenna 200 may send the first feedback signal current to the first circulator 403, and send the second feedback signal current to the second circulator, so that the first circulator 403 sends the first feedback signal current to the second phase shifter 402, and the second circulator 404 sends the second feedback signal current to the second phase shifter 402.

506. The second phase shifter 402 performs phase shift processing on the first feedback signal current to obtain a first phase-shifting feedback signal current.

In this case, the second phase shifter 402 may perform phase shift processing on the first feedback signal current again, to obtain a first piece of feedback information. Then, because phase shift is performed on a signal, a capability of cancelling interference in an excitation signal of the peripheral circuit 400 is effectively improved.

507. The second phase shifter 402 feeds back the first phase-shifting feedback signal current and the second feedback signal current.

Therefore, the second phase shifter 402 may feed back the first phase-shifting feedback signal current and the second feedback signal current.

Figure 6:
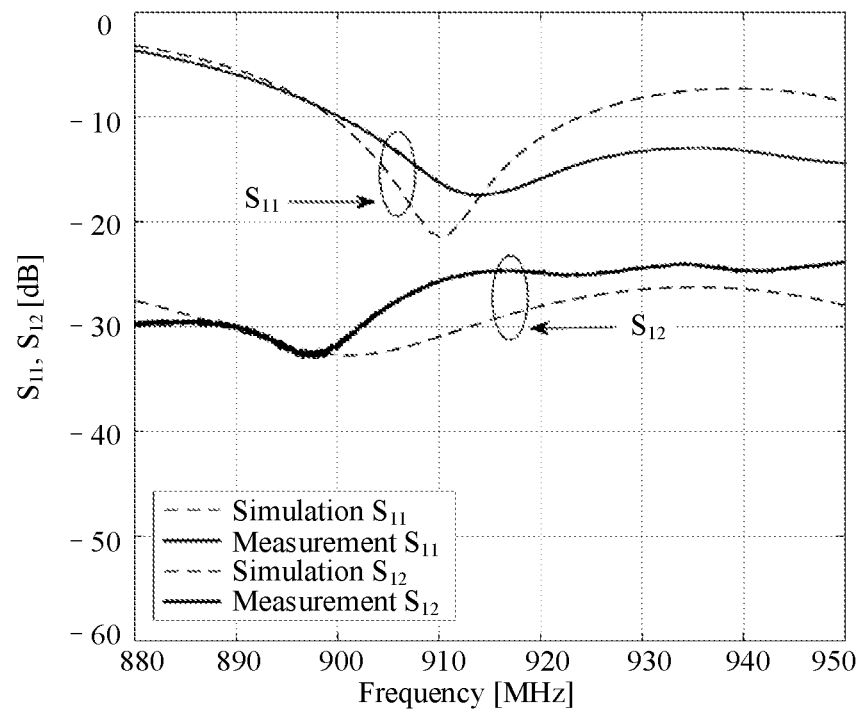
FIG. 6 shows simulation and measurement that are performed on the peripheral circuit 400 according to the embodiments of this application.

Through simulation and measurement that are performed on the peripheral circuit 400, FIG. 6 shows a result obtained by performing simulation and measurement on the antenna 200. Signal isolation between antenna ports reaches −33 dBm.

Figure 7:
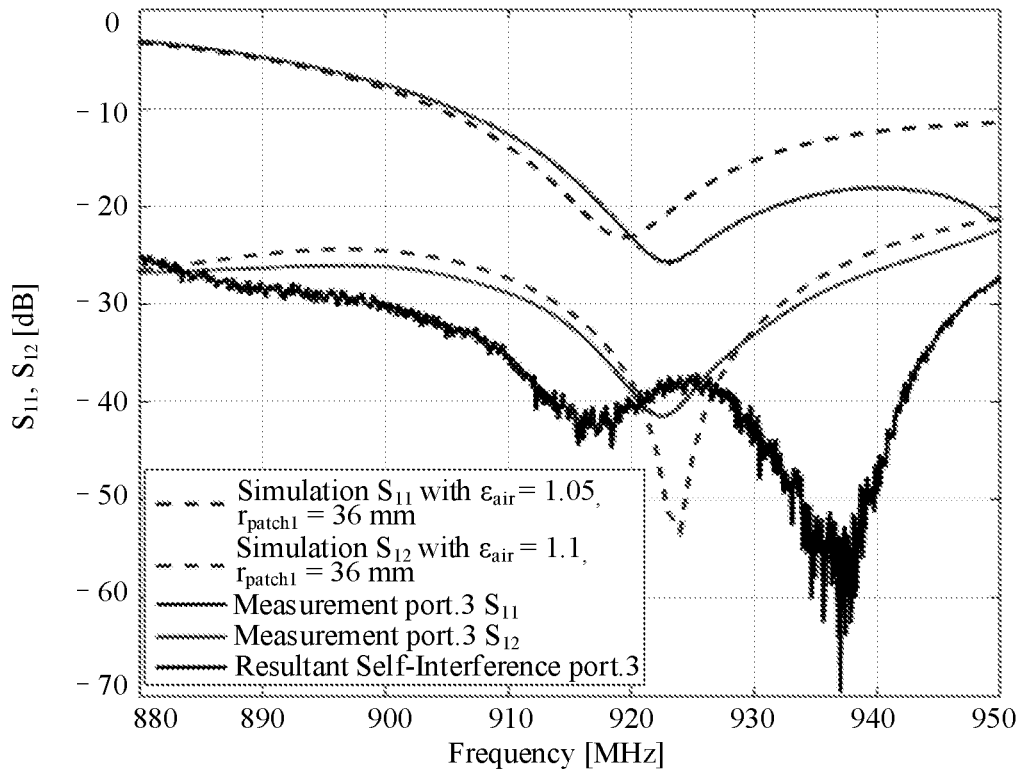
FIG. 7 shows an effect of signal isolation when the peripheral circuit is combined with the antenna according to the embodiments of this application.

FIG. 7 shows an effect of signal isolation when the peripheral circuit is combined with the antenna. It can be learned from the figure that the signal isolation reaches −53 dBm (simulation)/−42 dBm (measurement).

Figure 8:
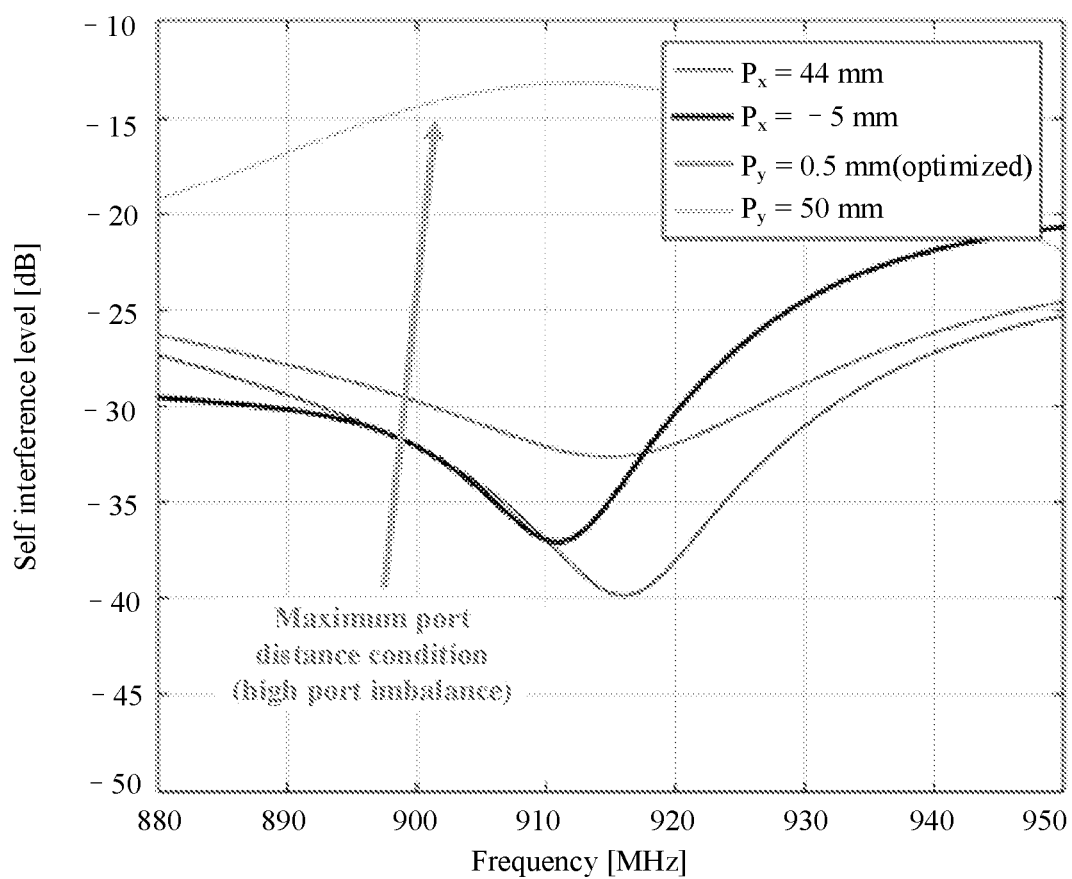
FIG. 8 shows effects generated because of different distances between a first probe 203 and a second probe 204 according to the embodiments of this application.

In some embodiments, a different distance between the first probe 203 and the second probe 204 indicates a different effect that is achieved. FIG. 8 shows different effects generated because of different distances between the first probe 203 and the second probe 204. It can be learned that when a distance between the first probe 203 and the second probe 204 is 4.4 millimeters or 5 millimeters, a best effect is achieved.

Optionally, space between the first-layer antenna 201 and the second-layer antenna 202 is filled with air or foam. Impact of the air and the foam on performance is shown in the following table.

|  | Foam | Air |
|---|---|---|
| Ground size [mm] | 120 × 120 | 120 × 120 |
| Filler height | 20 mm | 23 mm |
| S11 <− 10 dB BW | 902-931 MHz | 897-936 MHz |
| SIL <− 30 dB BW | 902-933 MHz | 913-931 MHz |
| SIL <− 40 dB BW | 915-923 MHz | 920-925 MHz |

It should be noted that the solutions of this application may alternatively be applied to a full-duplex system, or may be applied to a multiple input, multiple output (MIMO) system, a distributed antenna system, a repeater system, and a multi-carrier concurrent interference-limited system. This is not limited herein.

It will be clearly understood by a person skilled in the art that, for the purpose of convenient and brief description, for a detailed working process of the foregoing system, apparatus, and unit, reference is made to a corresponding process in the foregoing method embodiments, and details are not repeated.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in a form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions set forth in the foregoing embodiments or make equivalent replacements to some technical features thereof, without departing from the spirit and scope of the technical solutions of the embodiments of the present invention.

What is claimed is:

1. An antenna system, comprising:
   a peripheral circuit; and
   an antenna comprising: a first-layer antenna; a second-layer antenna; a first probe; a second probe; a first connector; and a second connector; wherein main bodies of the first-layer antenna and the second-layer antenna are planar insulation sheets, an annular microstrip patch is attached to each of the main bodies, and the annular microstrip patch is provided with a first feeding network and a second feeding network;
   wherein the main bodies are connected to each other by using an insulator column, and the first-layer antenna is parallel to and centrally aligned with the second-layer antenna;
   the first-layer antenna is connected to the first probe and the second probe using the first feeding network and the second feeding network respectively, the first probe and the second probe are rod-like and are parallel to each other, and the first probe and the second probe point to the second-layer antenna using a contact point between the first probe and the first-layer antenna and a contact point between the second probe and the first-layer antenna as start points respectively;
   the first-layer antenna is connected to the first connector and the second connector, wherein a position of the first connector corresponds to a position where the first probe is connected to the first-layer antenna, and a position of the second connector corresponds to a position where the second probe is connected to the first-layer antenna;
   the first connector and the second connector are configured to receive a first signal current and a second signal current respectively;
   the first probe and the second probe are configured to form vertical dipoles based on the first signal current and the second signal current respectively; and
   the first-layer antenna and the second-layer antenna are configured to generate a feedback signal current based on the vertical dipoles by using the annular microstrip patch attached to each of the first-layer antenna and the second-layer antenna.

2. The antenna system according to claim 1, wherein a space between the first-layer antenna and the second-layer antenna is filled with air or foam.

3. The antenna system according to claim 1, wherein a distance between the first probe and the second probe comprises 4.4 millimeters or 5 millimeters.

4. The antenna system according to claim 1, wherein the main bodies of the first-layer antenna and the second-layer antenna are rectangular or circular.

5. The antenna system according to claim 1, wherein annular microstrip patches are attached to two sides of at least one of the main bodies of the first-layer antenna and the second-layer antenna.

6. The antenna system according to claim 1, wherein the peripheral circuit comprises:
   a first phase shifter, a second phase shifter, a first circulator, a second circulator, and the antenna, wherein:
   the antenna is connected to the first circulator and the second circulator;
   the first phase shifter is connected to the first circulator and the second circulator;
   the second phase shifter is connected to the first circulator and the second circulator;
   the first phase shifter is configured to: receive a signal current, shunt the signal current to obtain the first signal current and the second signal current, perform phase shift processing on the first signal current to obtain a first phase-shifting signal current, send the first phase-shifting signal current to the first circulator, and send the second signal current to the second circulator;
   the first circulator is configured to send the first phase-shifting signal current to the antenna when receiving the first phase-shifting signal current sent by the first phase shifter;
   the second circulator is configured to send the second signal current to the antenna when receiving the second signal current sent by the first phase shifter;
   the antenna is configured to: receive the first phase-shifting signal current using the first connector, generate the feedback signal current based on the first phase-shifting signal current and the second signal current, shunt the feedback signal current to obtain a first feedback signal current and a second feedback signal current, send the first feedback signal current to the first circulator, and send the second feedback signal current to the second circulator;
   the first circulator is further configured to send the first feedback signal current to the second phase shifter when receiving the first feedback signal current sent by the antenna;
   the second circulator is further configured to send the second feedback signal current to the second phase shifter when receiving the second feedback signal current sent by the antenna; and
   the second phase shifter is configured to: when receiving the first feedback signal current and the second feedback signal current, perform phase shift processing on the first feedback signal current to obtain a first phase-shifting feedback signal current, and feedback the first phase-shifting feedback signal current and the second feedback signal current.

7. The antenna system according to claim 6, wherein the antenna is further configured to: receive a signal current sent by a reader, perform signal processing on the signal current by using the peripheral circuit to obtain the first phase-shifting feedback signal current and the second feedback signal current, and send the first phase-shifting feedback signal current and the second feedback signal current to the reader.

* * * * *